United States Patent
Xi

(10) Patent No.: US 8,686,703 B2
(45) Date of Patent: Apr. 1, 2014

(54) SWITCHING POWER SUPPLY WITH FIXED OFF TIME MODE AND CONTROL METHOD THEREOF

(75) Inventor: Xiaoyu Xi, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 163 days.

(21) Appl. No.: 13/431,199

(22) Filed: Mar. 27, 2012

(65) Prior Publication Data

US 2013/0241511 A1 Sep. 19, 2013

(30) Foreign Application Priority Data

Mar. 13, 2012 (CN) .......................... 2012 1 0064490

(51) Int. Cl.
*G05F 1/00* (2006.01)
(52) U.S. Cl.
USPC .......................................... 323/283; 323/285
(58) Field of Classification Search
USPC ................................................. 323/283, 285
See application file for complete search history.

(56) References Cited

U.S. PATENT DOCUMENTS

| | | | | | |
|---|---|---|---|---|---|
| 6,081,134 | A | * | 6/2000 | Labram | 326/83 |
| 7,224,179 | B2 | * | 5/2007 | Kim | 326/26 |
| 2007/0247194 | A1 | * | 10/2007 | Jain | 326/87 |
| 2012/0280669 | A1 | * | 11/2012 | Li et al. | 323/284 |
| 2013/0113524 | A1 | * | 5/2013 | Rueger | 327/109 |

* cited by examiner

*Primary Examiner* — Adolf Berhane
*Assistant Examiner* — Emily P Pham
(74) *Attorney, Agent, or Firm* — Perkins Coie LLP

(57) ABSTRACT

The present invention provides a controller used in a switching power supply. The controller comprises an oscillator, a first comparison circuit and a logic circuit. The oscillator generates a slope compensation signal and a clock signal. The first comparison circuit generates a first comparison signal in accordance with a current sensing signal, a feedback signal and the slope compensation signal. The logic circuit generates a control signal to control the main switch based on the clock signal and the first compensation signal. If the on time of the main switch is longer than the predetermined time period, the slope compensation signal will have a first slew rate during the predetermined time period and a second slew rate out of the predetermined time period, wherein the second slew rate is smaller than the first slew rate.

16 Claims, 6 Drawing Sheets

SWITCHING POWER SUPPLY WITH FIXED OFF TIME MODE AND CONTROL METHOD THEREOF

CROSS-REFERENCE TO RELATED APPLICATION(S)

This application claims the benefit of CN application 201210064490.2, filed on Mar. 13, 2012, and incorporated herein by reference.

TECHNICAL FIELD

Embodiments of the present invention generally relate to electronic circuits, and more particularly, relate to switching power supplies with fixed off time mode and control methods thereof.

BACKGROUND

Switching power supplies are commonly used to provide electric power to many electronic devices. A transformer or an inductor is usually used as a tank element in the switching power supply. For example, an inductor is used in a BUCK converter. A main switch is electrically coupled to the inductor. The switch is turned on and off so as to alternately store energy in the inductor and transfer the stored energy to the load.

There are various control methods used in the switching power supply. The most popular one is fixed frequency peak current control. In this control method, the output signal of the switching power supply is sensed and compared with a reference signal to generate a feedback signal. The current flowing through the main switch is also sensed and a current sensing signal is generated. The current sensing signal is compared with the feedback signal. The main switch is turned off once the current sensing signal becomes larger than the feedback signal and turned on at a fixed frequency.

As well known, in the fixed frequency peak current control, a slope compensation signal should be added to the current sensing signal to suppress sub-harmonic oscillation when the duty cycle of the main switch is greater than 50%. The slope compensation signal is designed to cover the worst condition where the output voltage is the largest and the inductor is the smallest, so the slope compensation signal usually takes significant headroom when the duty cycle is large.

Generally, the main switch has a minimum off time period which limits the duty cycle. When the switching power supply needs to operate at a very high duty cycle, such as in a low dropout BUCK converter, a common practice is to extend the on time while keeping the off time fixed, hence the switching power supply is actually running in a fixed off time mode. In the fixed off time mode, the main switch is turned off once the current sensing signal becomes larger than the feedback signal, and turned on when the off time of the main switch reaches the minimum off time period.

The fixed off time mode doesn't require the slope compensation signal for stability. Also since the compensation slope signal takes significant headroom, to prevent the control circuit from running out of the headroom when the on time is extended, the peak amplitude of the slope compensation is usually clamped to a predetermined level after the switching power supply enters the fixed off time mode.

However, after the slope compensation signal is clamped, the falling edge of the control signal may be very sensitive to the noise on either the feedback signal or the current sensing signal if the ramp of the current sensing signal is too small. For a BUCK converter, the ramp of the current sensing signal purely depends on the inductance and the difference between the input voltage and output voltage. In conditions where the input and output voltages are very close, the ramp of the current sensing signal becomes so small that the switching frequency will be unstable due to noise in the system.

SUMMARY

The present invention is directed to a switching power supply with fixed off time mode and control method thereof. The switching power supply comprises a switching circuit, a current sensing circuit, a feedback circuit and a controller. The switching circuit comprises a main switch and converts an input signal into an output signal through the ON and OFF switching of the main switch. The current sensing circuit senses the current flowing through the main switch and generates a current sensing signal representative of it. The feedback circuit is coupled to the output terminal of the switching circuit and generates a feedback signal corresponding to the output signal.

The controller comprises an oscillator, a first comparison circuit and a logic circuit. The oscillator generates a slope compensation signal and a clock signal. The first comparison circuit is coupled to the oscillator, wherein the first comparison circuit generates a first comparison signal in accordance with the current sensing signal, the feedback signal and the slope compensation signal. The logic circuit is coupled to the oscillator and the first comparison circuit. The logic circuit generates a control signal to control the ON and OFF switching of the main switch based on the clock signal and the first compensation signal.

If the on time of the main switch is longer than the predetermined time period, the slope compensation signal will have a first slew rate during the predetermined time period and a second slew rate out of the predetermined time period, and the main switch will be turned on when its off time reaches a minimum off time period. The first and the second slew rates are both positive, and the second slew rate is smaller than the first slew rate.

In one embodiment, the oscillator has an input terminal, a first output terminal and a second output terminal, wherein the input terminal is coupled to the logic circuit to receive the control signal. The oscillator compares the on time of the main switch with the predetermined time period, and adjusts the slope compensation signal and the clock signal provided at the first and second output terminals based on the comparison result.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
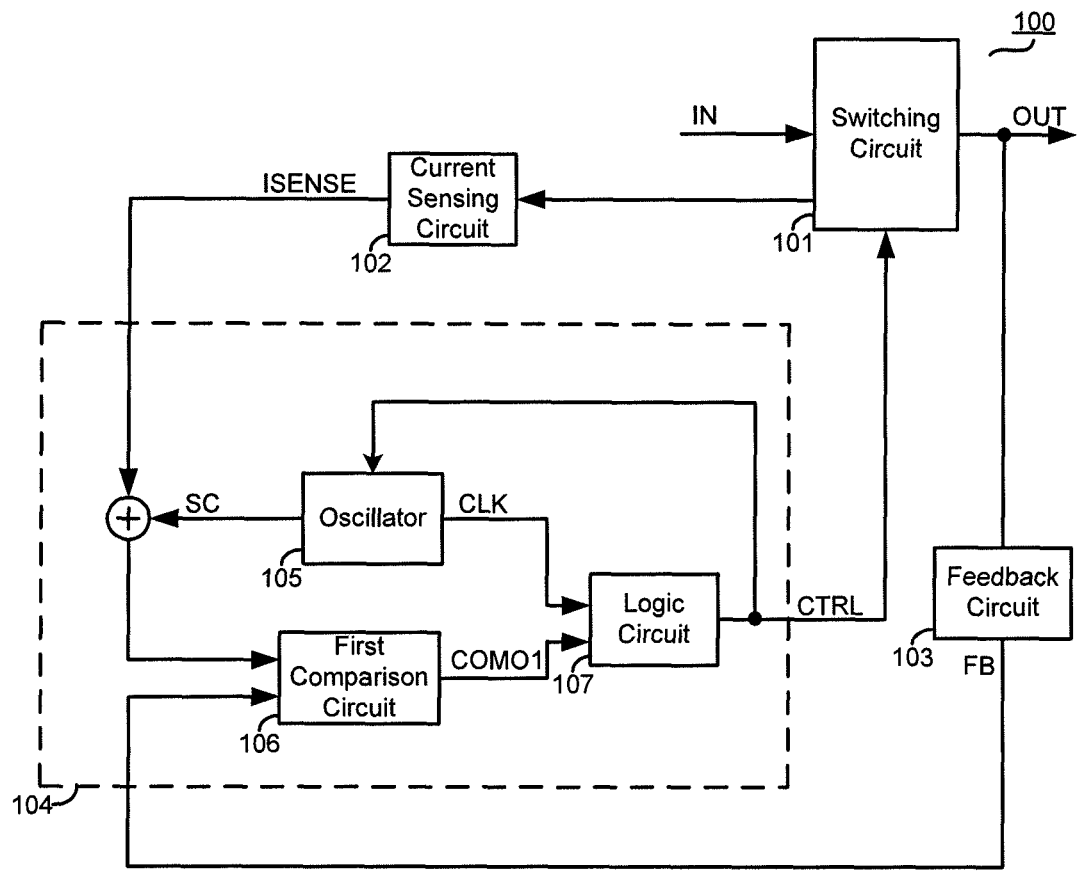
FIG. 1 is a block diagram of a switching power supply 100 in accordance with an embodiment of the present disclosure.

FIG. 1 is a block diagram of a switching power supply 100 in accordance with an embodiment of the present disclosure. The switching power supply 100 comprises a switching circuit 101, a current sensing circuit 102, a feedback circuit 103 and a controller 104. The switching circuit 101 comprises a main switch. The switching circuit 101 converts an input signal IN into an output signal OUT through the ON and OFF switching of the main switch. The input signal IN and the output signal OUT may be voltage signals, current signals, power signals or their combination. The switching circuit 101 may further comprises one or more switches besides the main switch. The switching circuit 101 may be configured in any known topology, such as BUCK converter, BOOST converter, Flyback converter and so on. The switches in the switching circuit 101 may be any controllable semiconductor device, such as MOSFET (metal oxide semiconductor field effect transistor), IGBT (isolated gate bipolar transistor) and so on.

The current sensing circuit 102 is coupled to the main switch. The current sensing circuit 102 senses the current flowing through the main switch and generates a current sensing signal ISENSE representative of it. The feedback circuit 103 is coupled to the output terminal of the switching circuit 101 and generates a feedback signal FB corresponding to the output signal OUT. In one embodiment, the feedback circuit 103 comprises an output sensing circuit and an error amplifier. In another embodiment where the switching circuit 101 is configured in a flyback converter, the feedback circuit 103 comprises a resistor, a three-terminal shunt regulator TR and an optical coupler. The controller 104 is coupled to the switching circuit 101, the current sensing circuit 102 and the feedback circuit 103. The controller 104 generates a control signal CTRL based on the current sensing signal ISENSE and the feedback signal FB to control the ON and OFF switching of the main switch.

The controller 104 comprises an oscillator 105, a first comparison circuit 106 and a logic circuit 107. The oscillator 105 is configured to generate a slope compensation signal SC and a clock signal CLK. If the on time of the main switch is longer than a predetermined time period TTH, the slope compensation signal SC will have a first slew rate during the predetermined time period TTH and a second slew rate out of the predetermined time period TTH. The first and the second slew rates are both positive, and the second slew rate is smaller than the first slew rate. The first comparison circuit 106 is coupled to the current sensing circuit 102, the feedback circuit 103 and the oscillator 105. The first comparison circuit 106 generates a first comparison signal COMO1 in accordance with the current sensing signal ISENSE, the feedback signal FB and the slope compensation signal SC. The logic circuit 107 is coupled to oscillator 105 and the first comparison circuit 106. The logic circuit 107 generates a control signal CTRL to control the ON and OFF switching of the main switch based on the clock signal CLK and the first compensation signal COMO1.

In one embodiment, the main switch is turned off once the sum of the slope compensation signal SC and the current sensing signal ISENSE becomes larger than the feedback signal FB. In one embodiment, when the on time of the main switch is shorter than the predetermined time period TTH, which means the duty cycle of the main switch is smaller than a predetermined duty cycle, a fixed frequency peak current control method is utilized in the switching power supply 100. The main switch is turned on at a fixed switching frequency. The slope compensation signal SC has the first slew rate. When the on time of the main switch is longer than the predetermined time period TTH, which means the duty cycle of the main switch is larger than a predetermined duty cycle, the switching power supply 100 works in a fixed off time mode. The main switch is turned on when its off time reaches a minimum off time period TOFF. The slope compensation signal SC has the first slew rate during the predetermined time period TTH and the second slew rate out of the predetermined time period TTH.

In one embodiment, the oscillator 105 has an input terminal, a first output terminal and a second output terminal. The input terminal is coupled to the logic circuit 107 to receive the control signal CTRL. The oscillator 105 compares the on time of the main switch with the predetermined time period TTH, and adjusts the slope compensation signal SC and the clock signal CLK provided at the first and second output terminals based on the comparison result.

Figure 2:
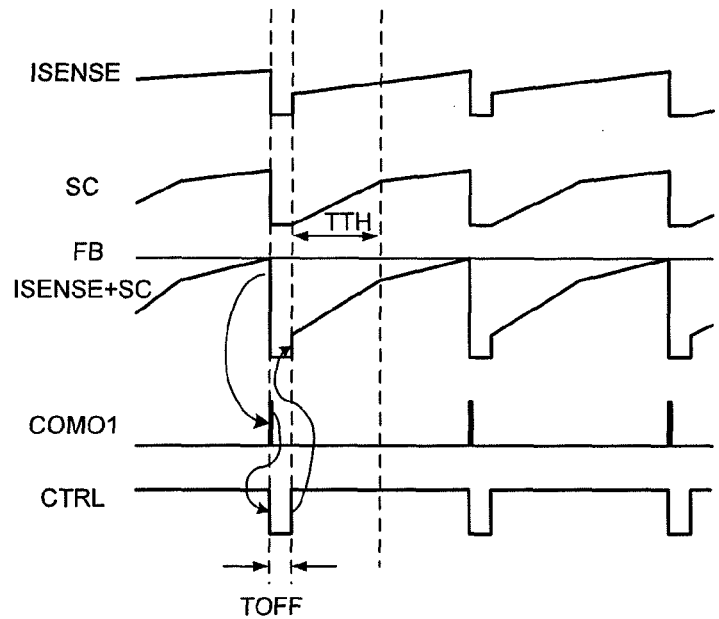
FIG. 2 is the waveform of the switching power supply 100 shown in FIG. 1 in accordance with one embodiment of the present disclosure.

FIG. 2 is the waveform of the switching power supply 100 shown in FIG. 1 in accordance with one embodiment of the present disclosure. As shown in the figure, the on time of the main switch is longer than the predetermined time period TTH. The slope compensation signal SC has a first slew rate during the predetermined time period TTH and a second slew rate out of the predetermined time period. The first and the second slew rates are both positive, and the second slew rate is smaller than the first slew rate. The switching power supply 101 is working in the fixed off time mode. Once the sum of the slope compensation signal SC and the current sensing signal ISENSE becomes larger than the feedback signal FB, the control signal CTRL is changed from high level into low level and the main switch is turned off. When the off time of the main switch reaches the minimum off time period TOFF, the control signal CTRL is changed from low level into high level and the main switch is turned on.

Since the slope compensation signal SC still has a certain slew rate in the fixed off time mode, the falling edge of the control signal CTRL will not be affected by the noise on either the feedback signal FB or the current sensing signal ISENSE while maintaining enough headroom of the control circuit 104. The stability of the switching power supply is enhanced.

Figure 3:
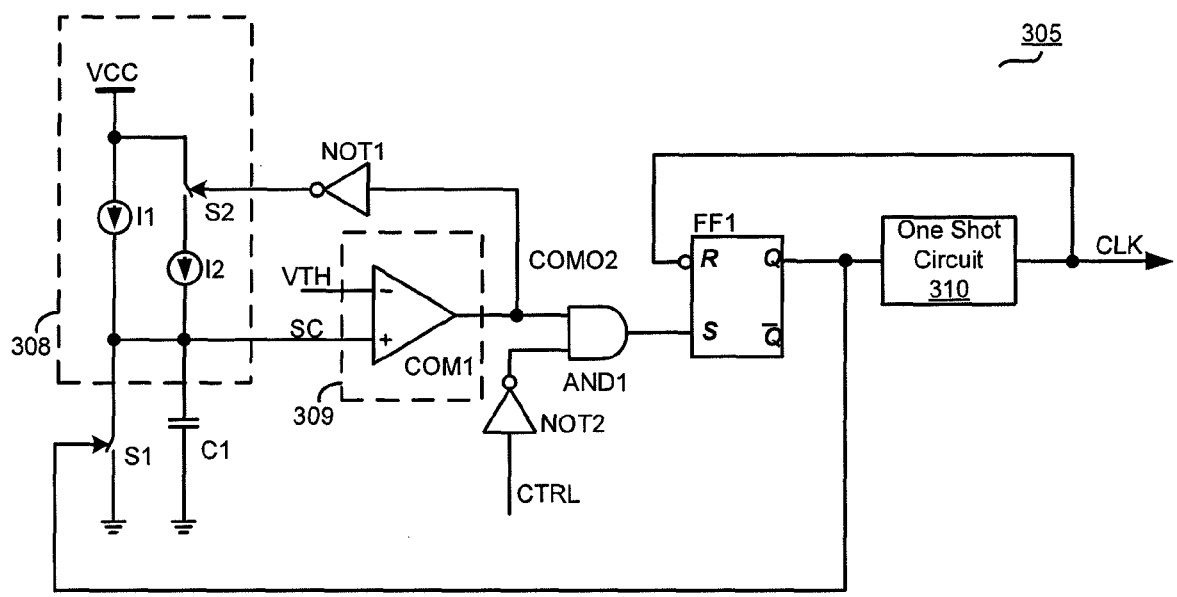
FIG. 3 illustrates an oscillator 305 in accordance with one embodiment of the present disclosure.

FIG. 3 illustrates an oscillator 305 in accordance with one embodiment of the present disclosure. The oscillator 305 comprises a capacitor C1, a switch S1, a charge circuit 308 and a second comparison circuit 309. The capacitor C1 has a first terminal and a second terminal, wherein the second terminal is grounded. The voltage across the capacitor C1 is used as the slope compensation signal SC. The switch S1 is coupled to the capacitor C1 in parallel. The charge circuit 308 is coupled to the first terminal of the capacitor C1 to provide a charge current for the capacitor C1. The second comparison circuit 309 has a first input terminal, a second input terminal and an output terminal. The first input terminal of the second comparison circuit 309 is coupled to the first terminal of the capacitor C1, the second input terminal is configured to receive a threshold voltage VTH, the output terminal is coupled to the charge circuit 309. Based on the voltage across the capacitor C1 and the threshold voltage VTH, the second comparison circuit 309 generates an output signal at its output terminal to adjust the charge current provided by the charge circuit 308. The charge current has a first current value when the voltage across the capacitor C1 is smaller than the threshold voltage VTH and a second current value when the voltage across the capacitor C1 is larger than the threshold voltage VTH. The first current value is larger than the second current value. In one embodiment, the switch S1 is turned on during the minimum off time period so as to discharge the capacitor C1.

In one embodiment, the charge circuit 308 comprises current sources I1, I2 and a switch S2. The current source I1 is coupled between a supply voltage VCC and the first terminal of the capacitor C1. The switch S2 has a first terminal, a second terminal and a gate terminal, wherein the first terminal is configured to receive the supply voltage VCC and the gate terminal is coupled to the output terminal of the second comparison circuit 309. The current source I2 having a first terminal and a second terminal, wherein the first terminal is coupled to the second terminal of the switch S2, the second terminal is coupled to the first terminal of the capacitor C1. The switch S2 is turned on when the voltage across the capacitor C1 is smaller than the threshold voltage VTH and turned off when the voltage across the capacitor C1 is larger than the threshold voltage VTH.

In one embodiment, the second comparison circuit 309 comprises a comparator COM1. The non-inverting input terminal of the comparator COM1 is coupled to the first terminal of the capacitor C1, the inverting input terminal is configured to receive the threshold voltage VTH, the output terminal is coupled to the gate of the switch S2 through a NOT gate NOT1. A second comparison signal COMO2 is provided at the output terminal of the comparator COM2.

It will be apparent to those skilled in the art that the charge circuit 308 may be realized by other electronic components or configurations. For example, the switch S2 and the current source I2 may be coupled between the first terminal of the capacitor C1 and the ground. The switch S2 is turned off when the voltage across the capacitor C1 is smaller than the threshold voltage VTH and turned on when the voltage across the capacitor C1 is larger than the threshold voltage VTH.

In one embodiment, the oscillator 305 further comprises an AND gate AND1, a NOT gate NOT2, a flip flop FF1 and a one shot circuit 310. The AND gate has a first input terminal, a second input terminal and an output terminal, wherein the first input terminal is coupled to the output terminal of the comparator COM1. The input terminal of the NOT gate NOT2 is coupled to the logic circuit to receive the control signal CTRL, the output terminal is coupled to the second input terminal of the AND gate AND1. The flip flop FF1 having a set terminal S, a reset terminal R and an output terminal Q, wherein the set terminal S is coupled to the output terminal of the AND gate AND1, the output terminal is coupled to the gate of the switch S1 and the input terminal of the one shot circuit 310. The set terminal S is raising edge effective and the reset terminal R is falling edge effective. The output terminal of the one shot circuit 310 is coupled to the reset terminal R of the flip flop FF1. The output signal of the one shot circuit 310 is used as the clock signal CLK.

Figure 4:
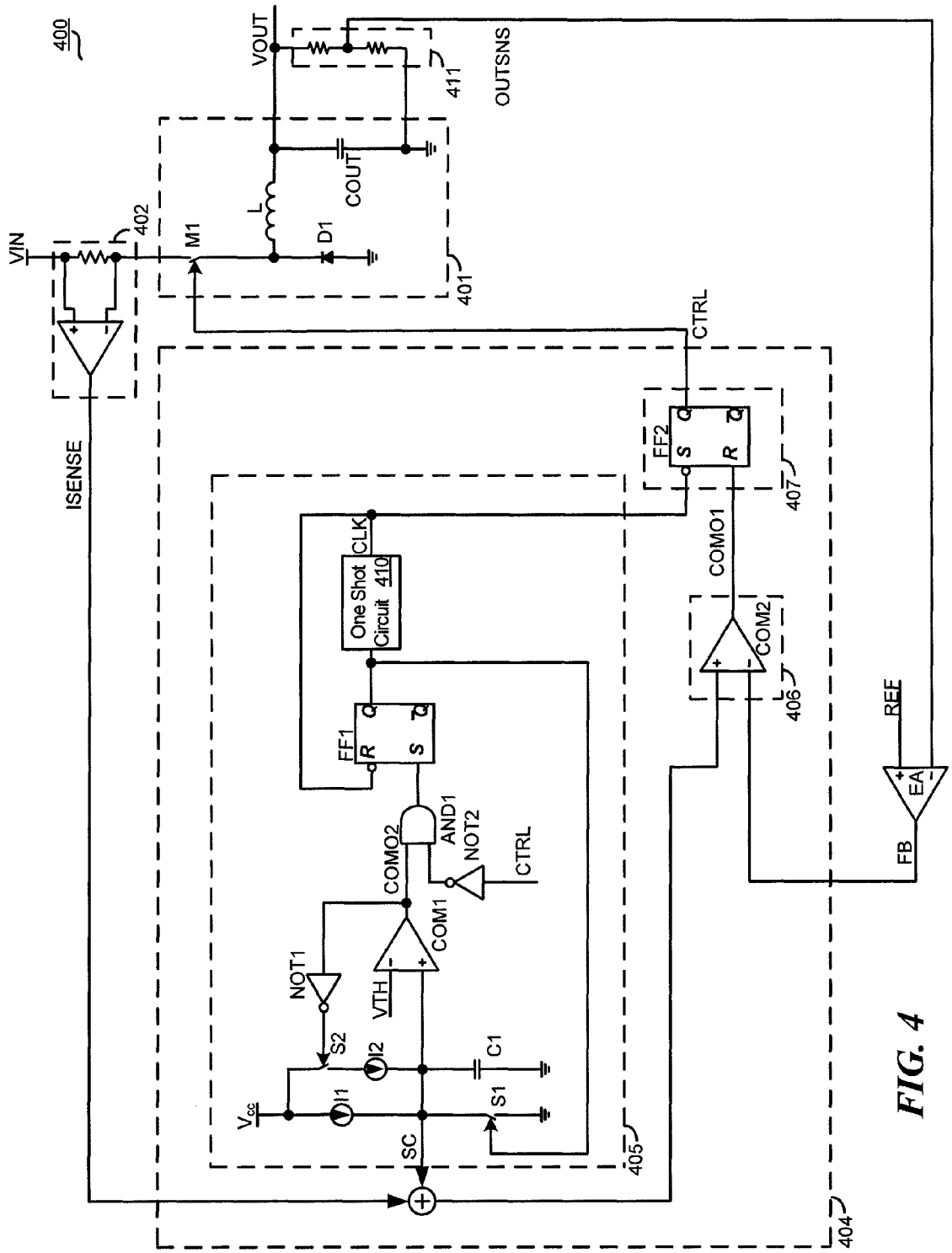
FIG. 4 illustrates a switching power supply 400 in accordance with one embodiment of the present disclosure.

FIG. 4 illustrates a switching power supply 400 in accordance with one embodiment of the present disclosure. The switching circuit 401 is configured in a BUCK converter. It comprises a main switch M1, a diode D1, an inductor L and an output capacitor COUT, connected as shown in the figure. The switching circuit 401 converts an input voltage VIN into an output voltage VOUT through the ON and OFF switching of the main switch M1. In one embodiment, the diode D1 is replaced by a synchronous switch.

The current sensing circuit 402 is coupled to the main switch M1. It senses the current flowing through the main switch M1 and generates the current sensing signal ISENSE. In one embodiment, the current sensing circuit 402 comprises a sensing resistor serially coupled to the main switch M1 and a sensing amplifier coupled to the sensing resistor in parallel. The feedback circuit comprises an output sensing circuit 411 and an error amplifier EA. The output sensing circuit 411 is coupled to the output terminal of the switching circuit 401. It senses the output voltage VOUT and generates an output sensing signal OUTSNS. In one embodiment, the output sensing circuit 411 comprises a resistor divider. The non-inverting input terminal of the error amplifier EA is configured to receive a reference signal REF, the inverting input terminal is coupled to the output sensing circuit 411 to receive the output sensing signal OUTSNS. The feedback signal FB is provided at the output terminal of the error amplifier EA. In one embodiment, the error amplifier EA and the controller are integrated in a single die.

The controller 404 comprises an oscillator 405, a first comparison circuit 406 and a logic circuit 407. The structure of the oscillator 405 is substantially same as that of the oscillator 305 shown in FIG. 3. The first comparison circuit 406 comprises a comparator COM2. The non-inverting input terminal of the comparator COM2 is configured to receive the sum of the current sensing signal ISENSE and the slope compensation signal SC, the inverting input terminal is coupled to the output terminal of the error amplifier EA to receive the feedback signal FB. The first comparison signal COMO1 is provided at the output terminal of the comparator COM2. The logic circuit 407 comprises a flip flop FF2 having a set terminal S, a reset terminal R and an output terminal Q. The set terminal S of the flip flop FF2 is coupled to the oscillator 405 to receive the clock signal CLK, the reset terminal R is coupled to the output terminal of the comparator COM2, the output terminal Q is coupled to the gate of the main switch M1 to provide the control signal CTRL. The set terminal S of the flip flop FF2 is falling edge effective, and the reset terminal R is high effective. The flip flop FF2 is reset dominant. It will be apparent to those skilled in the art that the NOT gate NOT2 may be eliminated, and the second input terminal of the AND gate AND1 may be directly coupled to the inverting output terminal/Q of the flip flop FF2.

Figure 5:
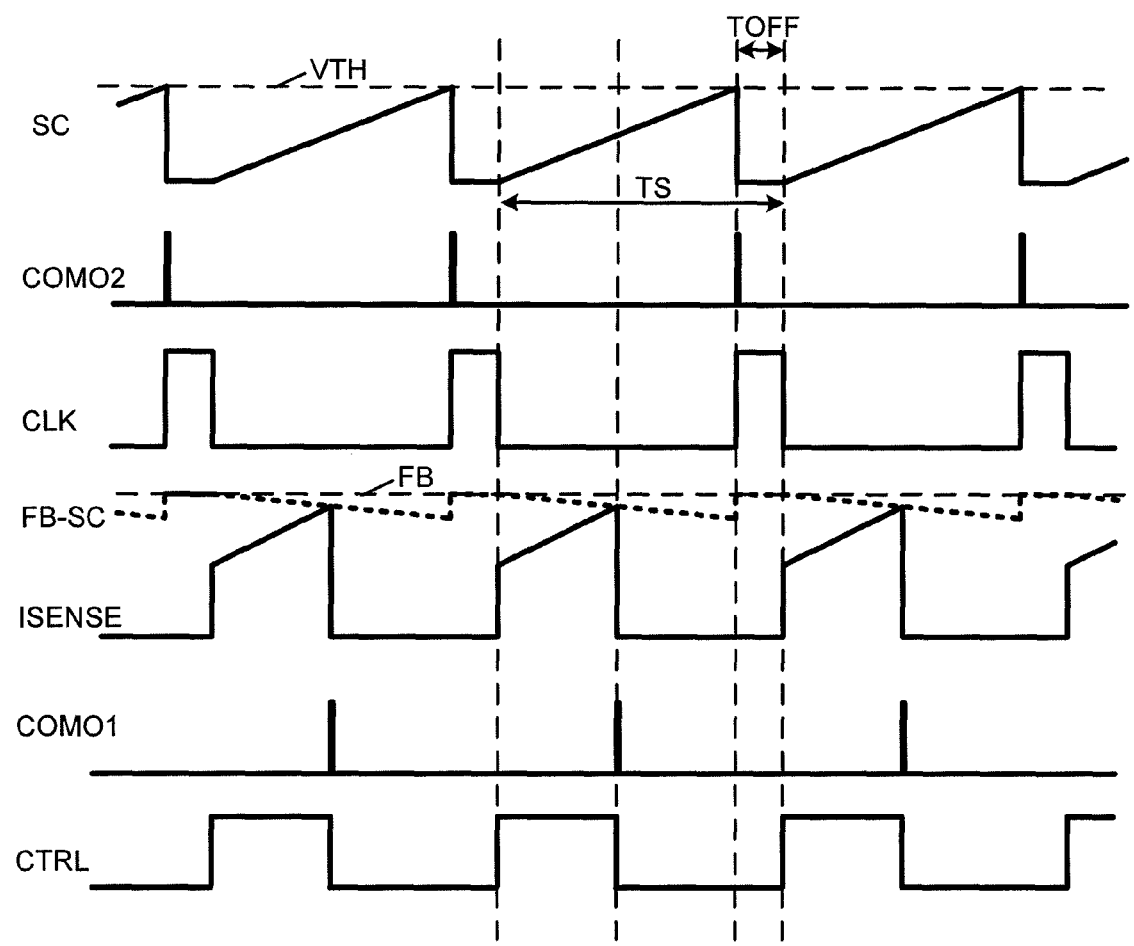
FIG. 5 and FIG. 6 are waveforms of the switching power supply 400 shown in FIG. 4, in accordance with one embodiment of the present disclosure.
Figure 6:
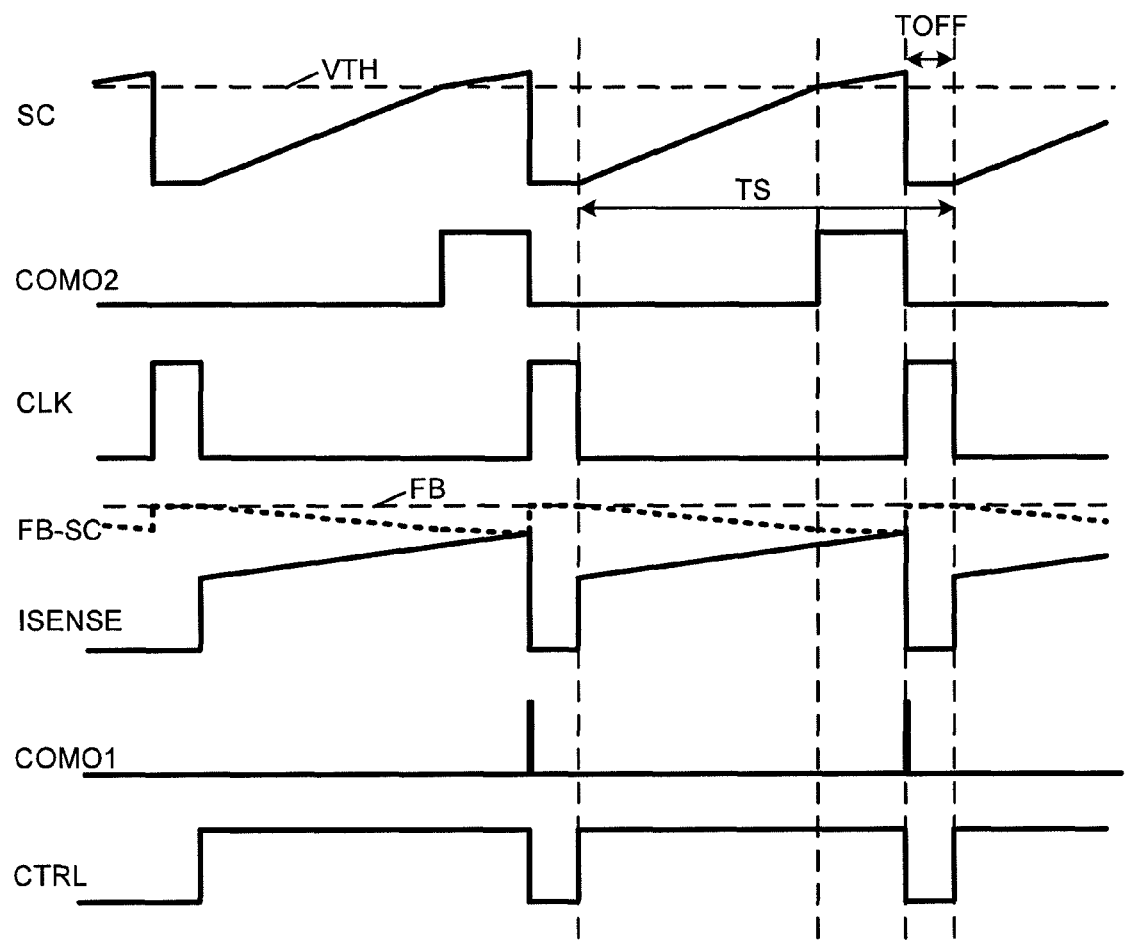

FIG. 5 and FIG. 6 are waveforms of the switching power supply 400 shown in FIG. 4, in accordance with one embodiment of the present disclosure. In FIG. 5, the duty cycle of the main switch M1 is smaller than the predetermined duty cycle and the on time of the main switch M1 is shorter than the predetermined time period TTH. At the falling edge of the clock signal CLK, the flip flop FF1 is reset and the flip flop FF2 is set. The control signal CTRL is changed from low into high and the main switch M1 is turned on. The current flowing through the main switch M1 and the current sensing signal ISENSE are both increased. The switch S1 is turned off. Since the slope compensation signal SC is smaller than the voltage threshold VTH then, the second comparison signal COMO2 is low and the switch S2 is turned on. The capacitor C1 is charged by the current sources I1 and I2, and the slope compensation signal SC is increased.

The sum of the current sensing signal ISENSE and the slope compensation signal SC becomes larger than the feedback signal FB before the slope compensation signal SC reaches the threshold voltage VTH. The first comparison signal COMO1 is changed from low into high and the flip flop FF2 is reset. The control signal CTRL is changed from high into low and the main switch M1 is turned off. Since the slope compensation signal SC is still smaller than the threshold voltage VTH, the second comparison signal COMO2 is still low and the output signal of the AND gate AND1 is low.

When the slope compensation signal SC is increased to be larger than the threshold voltage VTH, the output signal of the AND gate AND1 as well as the second comparison signal COMO2 is changed from low into high. The flip flop FF1 is set and its output signal is changed from low into high. The switch S1 is turned on and the one shot circuit 410 is triggered. The capacitor C1 is discharged through the switch S1, and the slope compensation signal SC is quickly reduced to zero. A pulse signal used as the CLK signal is generated by the one shot circuit 410. The CLK signal maintains high during the minimum off time period TOFF and is changed into low after then. At the falling edge of the clock signal CLK, the flip flop FF1 is reset and the flip flop FF2 is set. The switch S1 is turned off and the main switch M1 is turned on. These processes are repeated. The switching period TS of the main switch M1 is the sum of the minimum off time period TOFF and the time spent on increasing the slope compensation signal SC from zero to the threshold voltage VTH. So the switching period TS is constant.

In FIG. 6, the duty cycle of the main switch M1 is larger than the predetermined duty cycle, and the on time of the main switch M1 is longer than the predetermined time period TTH. At the falling edge of the clock signal CLK, the flip flop FF1 is reset and the flip flop FF2 is set. The control signal CTRL is changed from low into high and the main switch M1 is turned on. The current flowing through the main switch M1 and the current sensing signal ISENSE are both increased. The switch 51 is turned off. Since the slope compensation signal SC is smaller than the voltage threshold VTH then, the second comparison signal COMO2 is low and the switch S2 is turned on. The capacitor C1 is charged by the current sources I1 and I2, and the slope compensation signal SC is increased.

When the slope compensation signal SC is increased to be larger than the threshold voltage VTH, the second comparison signal COMO2 is changed from low into high. The switch S2 is turned off and the current source I2 is disconnected from the capacitor C1. The charge current of the capacitor C1 is changed from I1+I2 into I1. Since the control signal CTRL is still high then, the output signal of the AND gate AND1 is low.

When the sum of the current sensing signal ISENSE and the slope compensation signal SC becomes larger than the feedback signal FB, the first comparison signal COMO1 is changed from low into high and the flip flop FF2 is reset. The control signal CTRL is changed from high into low and the main switch M1 is turned off. The output signal of the AND gate AND1 is changed from low into high. The flip flop FF1 is set and its output signal is changed from low into high. The switch S1 is turned on and the one shot circuit 410 is triggered. The capacitor C1 is discharged through the switch S1, and the slope compensation signal SC is quickly reduced to zero. A pulse signal used as the CLK signal is generated by the one shot circuit 410. The CLK signal maintains high during the minimum off time period TOFF and is changed into low after then. At the falling edge of the clock signal CLK, the flip flop FF1 is reset and the flip flop FF2 is set. The switch S1 is turned off and the main switch M1 is turned on. These processes are repeated. The switching period TS of the main switch M1 is the sum of the minimum off time period TOFF and the time spent on increasing the sum of the current sensing signal ISENSE and the slope compensation signal SC to reach the feedback signal FB. So the switching period TS varies with the load. The off time of the main switch M1 is equal to the minimum off time period TOFF.

Since the slope compensation signal SC still has a certain slew rate (which is determined by the current source I1) in the fixed off time mode, the falling edge of the control signal CTRL will not be affected by the noise on either the feedback signal FB or the current sensing signal ISENSE while maintaining enough headroom of the control circuit. The stability of the switching power supply is enhanced.

Figure 7:
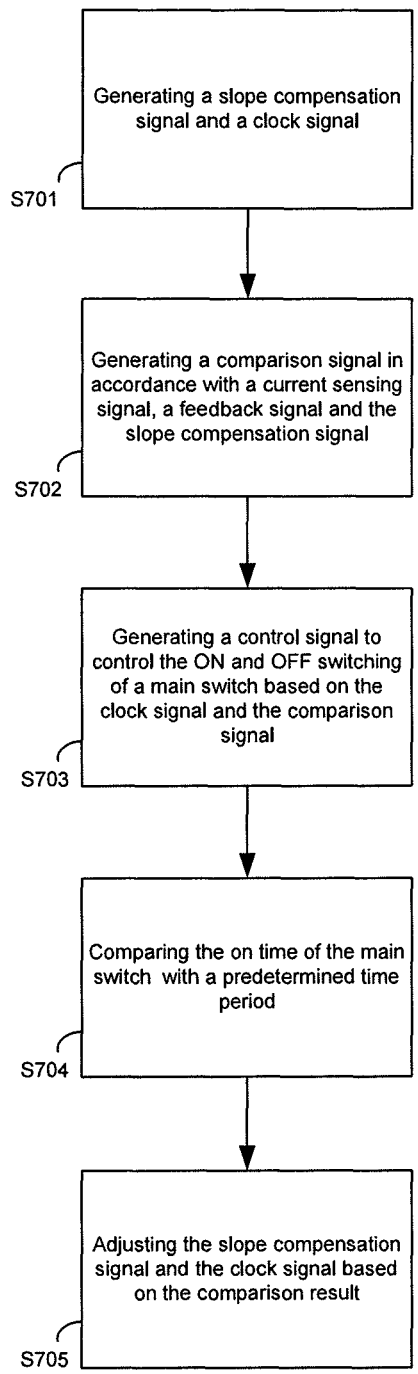
FIG. 7 is a flow chart of a control method of a switching power supply, in accordance with an embodiment of the present disclosure.

FIG. 7 is a flow chart of a control method of a switching power supply, in accordance with an embodiment of the present disclosure. The switching power supply comprises a switching circuit having a main switch. The switching circuit converts an input signal into an output signal through the ON and OFF switching of the main switch. The control method comprises steps S701~S705.

At step S701, a slope compensation signal and a clock signal are generated.

At step S702, a comparison signal is generated in accordance with a current sensing signal representative of the current flowing through the main switch, a feedback signal corresponding to the output signal of the switching circuit, and the slope compensation signal.

At step S703, a control signal is generated to control the ON and OFF switching of the main switch based on the clock signal and the compensation signal.

If the on time of the main switch is longer than the predetermined time period, the slope compensation signal will have a first slew rate during the predetermined time period and a second slew rate out of the predetermined time period, and the main switch will be turned on when its off time reaches a minimum off time period. The first and the second slew rates are both positive, and the second slew rate is smaller than the first slew rate.

In one embodiment, the control method further comprises steps S704 and S705. At step S704, the on time of the main switch is compared with the predetermined time period. At step S605, the slope compensation signal and the clock signal are adjusted based on the comparison result.

In one embodiment, the step of generating the slope compensation signal and the clock signal comprises: charging a capacitor by a charge current, wherein the voltage across the capacitor is the slope compensation signal; coupling a first switch to the capacitor in parallel; comparing the voltage across the capacitor with a threshold voltage; and adjusting the charge current based on the comparison result. The charge current has a first current value when the voltage across the capacitor is smaller than the threshold voltage and a second current value when the voltage across the capacitor is larger than the threshold voltage, wherein the first current value is larger than the second current value. In one embodiment, the step of generating the slope compensation signal and the clock signal further comprises turning on the first switch during the minimum off time period.

Obviously many modifications and variations of the present invention are possible in light of the above teachings.

It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A controller used in a switching power supply, wherein the switching power supply comprises a switching circuit having a main switch and configured to provide an output signal, the controller comprises:
   an oscillator configured to generate a slope compensation signal and a clock signal;
   a first comparison circuit coupled to the oscillator, wherein the first comparison circuit generates a first comparison signal in accordance with a current sensing signal representative of the current flowing through the main switch, a feedback signal corresponding to the output signal of the switching circuit, and the slope compensation signal; and
   a logic circuit coupled to the oscillator and the first comparison circuit, wherein based on the clock signal and the first compensation signal, the logic circuit generates a control signal to control the ON and OFF switching of the main switch; wherein
   if the on time of the main switch is longer than a predetermined time period, the slope compensation signal will have a first slew rate during the predetermined time period and will have a second slew rate outside of the predetermined time period, and wherein the first and the second slew rates are both positive, and the second slew rate is smaller than the first slew rate.

2. The controller of claim 1, wherein the oscillator has an input terminal, a first output terminal and a second output terminal, wherein the input terminal is coupled to the logic circuit to receive the control signal, and wherein the oscillator, based on comparing the on time of the main switch with the predetermined time period, provides the slope compensation signal at the first output terminal, and wherein the oscillator provides the clock signal at the second output terminal.

3. The controller of claim 1, wherein the oscillator comprises:
   a capacitor having a first terminal and a second terminal, wherein the first terminal is configured to provide the slope compensation signal and the second terminal is grounded;
   a first switch coupled to the capacitor in parallel;
   a charge circuit coupled to the first terminal of the capacitor, wherein the charge circuit is configured to provide a charge current to the capacitor; and
   a second comparison circuit having a first input terminal, a second input terminal and an output terminal, wherein the first input terminal is coupled to the first terminal of the capacitor, the second input terminal is configured to receive a threshold voltage, the output terminal is coupled to the charge circuit, and wherein based on the voltage across the capacitor and the threshold voltage, the second comparison circuit generates an output signal at the output terminal to adjust the charge current provided by the charge circuit; wherein the charge current has a first current value when the voltage across the capacitor is smaller than the threshold voltage and a second current value when the voltage across the capacitor is larger than the threshold voltage, wherein the first current value is larger than the second current value.

4. The controller of claim 3, wherein the first switch is turned on during a minimum off time period.

5. The controller of claim 3, wherein the charge circuit comprises:
   a first current source coupled between a supply voltage and the first terminal of the capacitor;
   a second switch having a first terminal, a second terminal and a gate terminal, wherein the first terminal is configured to receive the supply voltage, the gate terminal is coupled to the output terminal of the second comparison circuit; and
   a second current source having a first terminal and a second terminal, wherein the first terminal is coupled to the second terminal of the second switch, the second terminal is coupled to the first terminal of the capacitor; wherein
   the second switch is turned on when the voltage across the capacitor is smaller than the threshold voltage and turned off when the voltage across the capacitor is larger than the threshold voltage.

6. The controller of claim 3, wherein the oscillator further comprises:
   an AND gate having a first input terminal, a second input terminal and an output terminal, wherein the first input terminal is coupled to the output terminal of the second comparison circuit;
   a NOT gate having an input terminal and an output terminal, wherein the input terminal of the NOT gate is coupled to the logic circuit to receive the control signal, the output terminal of the NOT gate is coupled to the second input terminal of the AND gate;
   a flip flop having a first input terminal, a second input terminal and an output terminal, wherein the first input terminal is coupled to the output terminal of the AND gate, the output terminal is coupled to the gate of the first switch; and
   a one shot circuit having an input terminal and an output terminal, wherein the input terminal of the one shot circuit is coupled to the output terminal of the flip flop, the output terminal is coupled to the second input terminal of the flip flop and the logic circuit to provide the clock signal.

7. A controller used in a switching power supply, wherein the switching power supply comprises a switching circuit having a main switch, the controller comprises:
   an oscillator configured to generate a slope compensation signal and a clock signal;
   a first comparator having a first input terminal, a second input terminal and an output terminal, wherein the first input terminal is configured to receive a sum of the slope compensation signal and a current sensing signal representative of the current flowing through the main switch, the second input terminal is configured to receive a feedback signal corresponding to an output signal of the switching circuit; and
   a first flip flop having a first input terminal, a second input terminal and an output terminal, wherein the first input terminal is coupled to the oscillator to receive the clock signal, the second input terminal is coupled to the output terminal of the first comparator, and wherein based on the clock signal and the output signal of the first comparator, the first flip flop provides a control signal at the output terminal to control the ON and OFF switching of the main switch; wherein if the on time of the main switch is shorter than a predetermined time period, the slope compensation signal will have a first slew rate and the main switch will be turned on at a fixed frequency;

if the on time of the main switch is longer than the predetermined time period, the slope compensation signal will have a first slew rate during the predetermined time period and will have a second slew rate outside of the predetermined time period, and the main switch will be turned on when the off time of the main switch reaches a minimum off time period;

wherein the first and the second slew rates are both positive, and the second slew rate is smaller than the first slew rate.

8. The controller of claim 7, wherein the oscillator has an input terminal, a first output terminal and a second output terminal, wherein the input terminal is coupled to the output terminal of the first flip flop to receive the control signal, and wherein the oscillator, based on comparing the on time of the main switch with the predetermined time period, provides the slope compensation signal at the first output terminal, and wherein the oscillator provides the clock signal at the second output terminal.

9. The controller of claim 8, wherein the oscillator comprises:

a capacitor having a first terminal and a second terminal, wherein the first terminal is configured to provide the slope compensation signal and the second terminal is grounded;

a first switch coupled to the capacitor in parallel;

a charge circuit coupled to the first terminal of the capacitor, wherein the charge circuit is configured to provide a charge current to the capacitor; and a second comparator having a first input terminal, a second input terminal and an output terminal, wherein the first input terminal is coupled to the first terminal of the capacitor, the second input terminal is configured to receive a threshold voltage, the output terminal is coupled to the charge circuit, and wherein based on the voltage across the capacitor and the threshold voltage, the second comparator generates an output signal at the output terminal to adjust the charge current provided by the charge circuit; wherein the charge current has a first current value when the voltage across the capacitor is smaller than the threshold voltage and a second current value when the voltage across the capacitor is larger than the threshold voltage, wherein the first current value is larger than the second current value.

10. The controller of claim 9, wherein the first switch is turned on during the minimum off time period when the main switch is off.

11. The controller of claim 9, wherein the charge circuit comprises:

a first current source coupled between the supply voltage and the first terminal of the capacitor;

a second switch having a first terminal, a second terminal and a gate terminal, wherein the first terminal is configured to receive the supply voltage, the gate terminal is coupled to the output terminal of the second comparator; and a second current source having a first terminal and a second terminal, wherein the first terminal is coupled to the second terminal of the second switch, the second terminal is coupled to the first terminal of the capacitor; wherein the second switch is turned on when the voltage across the capacitor is smaller than the threshold voltage and turned off when the voltage across the capacitor is larger than the threshold voltage.

12. The controller of claim 9, wherein the oscillator further comprises:

an AND gate having a first input terminal, a second input terminal and an output terminal, wherein the first input terminal is coupled to the output terminal of the second comparator;

a NOT gate having an input terminal and an output terminal, wherein the input terminal of the NOT gate is coupled to the output terminal of the first flip flop to receive the control signal, the output terminal of the NOT gate is coupled to the second input terminal of the AND gate;

a second flip flop having a first input terminal, a second input terminal and an output terminal, wherein the first input terminal is coupled to the output terminal of the AND gate, the output terminal is coupled to the gate of the first switch; and a one shot circuit having an input terminal and an output terminal, wherein the input terminal of the one shot circuit is coupled to the output terminal of the second flip flop, the output terminal is coupled to the second input terminal of the second flip flop and the first input terminal of the first flip flop to provide the clock signal.

13. A control method of a switching power supply, wherein the switching power supply comprises a switching circuit having a main switch, the control method comprises:

generating a slope compensation signal and a clock signal;

generating a comparison signal in accordance with a current sensing signal representative of the current flowing through the main switch, a feedback signal corresponding to the output signal of the switching circuit, and the slope compensation signal; and generating a control signal to control the ON and OFF switching of the main switch based on the clock signal and the compensation signal; wherein if the on time of the main switch is longer than a predetermined time period, the slope compensation signal will have a first slew rate during the predetermined time period and will have a second slew rate outside of the predetermined time period, and wherein the first and the second slew rates are both positive, and the second slew rate is smaller than the first slew rate.

14. The control method of claim 13, further comprises:

comparing the on time of the main switch with the predetermined time period; and adjusting the slope compensation signal and the clock signal based on the comparison result.

15. The control method of claim 13, wherein the step of generating the slope compensation signal and the clock signal comprises:

charging a capacitor by a charge current, wherein the voltage across the capacitor is the slope compensation signal;

coupling a first switch to the capacitor in parallel;

comparing the voltage across the capacitor with a threshold voltage; and adjusting the charge current based on the comparison result; wherein the charge current has a first current value when the voltage across the capacitor is smaller than the threshold voltage, and a second current value when the voltage across the capacitor is larger than the threshold voltage, wherein the first current value is larger than the second current value.

16. The control method of claim 15, wherein the step of generating the slope compensation signal and the clock signal further comprises turning on the first switch during the minimum off time period.

* * * * *